(12) United States Patent
Sylvain

(10) Patent No.: US 8,339,438 B2
(45) Date of Patent: Dec. 25, 2012

(54) WEB BASED ACCESS TO VIDEO ASSOCIATED WITH CALLS

(75) Inventor: Dany Sylvain, Gatineau (CA)

(73) Assignee: Rockstar Consortium US LP, Richardson, TX (US)

( * ) Notice: Subject to any disclaimer, the term of this patent is extended or adjusted under 35 U.S.C. 154(b) by 1025 days.

(21) Appl. No.: 12/344,010

(22) Filed: Dec. 24, 2008

(65) Prior Publication Data

US 2010/0157013 A1    Jun. 24, 2010

(51) Int. Cl.
*H04N 7/14* (2006.01)

(52) U.S. Cl. ............... 348/14.01; 348/14.03; 348/14.04

(58) Field of Classification Search .... 348/14.01–14.16; 725/106, 131, 117, 119; 370/486, 448; 379/93.02
See application file for complete search history.

(56) References Cited

U.S. PATENT DOCUMENTS

| | | | |
|---|---|---|---|
| 5,790,180 A * | 8/1998 | Wild ........................... | 348/14.11 |
| 7,218,338 B2 * | 5/2007 | McKnight et al. ......... | 348/14.09 |
| 7,961,212 B2 * | 6/2011 | Woodworth et al. ...... | 348/14.01 |
| 2003/0046705 A1 * | 3/2003 | Sears ........................ | 725/106 |
| 2007/0053346 A1 * | 3/2007 | Bettis et al. ................ | 370/352 |

FOREIGN PATENT DOCUMENTS

| | | |
|---|---|---|
| WO | 03055193 A1 | 7/2003 |
| WO | 2004008729 A2 | 1/2004 |
| WO | 2004032473 A1 | 4/2004 |
| WO | 2004057818 A1 | 7/2004 |

OTHER PUBLICATIONS

International Search Report for PCT/IB2009/007629, mailed Aug. 19, 2010.

* cited by examiner

*Primary Examiner* — Melur Ramakrishnaiah
(74) *Attorney, Agent, or Firm* — Withrow & Terranova, PLLC

(57) ABSTRACT

In a communication environment where a voice bearer is established between a multimedia terminal of a first user and a voice terminal of a second user to allow voice communications between the first and second users, the present invention allows the second user to gain access to video content of the first user through a web session.

37 Claims, 12 Drawing Sheets

WEB BASED ACCESS TO VIDEO ASSOCIATED WITH CALLS

FIELD OF THE DISCLOSURE

The present invention relates to video sharing, and in particular to allowing access to a video portion of a voice and video call through a web session.

BACKGROUND

Many modern mobile telephones have the ability to capture video content and share video content with other compatible telephones, which are subscribed to a service that supports the sharing of video content. While sharing video content is increasingly desirable, users are significantly limited to sharing video only with other users who have compatible telephones and subscribe to a video sharing service. As such, users who have compatible telephones but do not subscribe to a compatible video server cannot share video. Users who have telephones that are capable of sharing video content cannot share their video content with other users who do not have compatible telephones. Given the apparent desire to share video content and the limited ability to do so, there is a need for an effective and efficient technique to allow users to share video content from their telephones with users who either do not have compatible telephones or do not subscribe to compatible video sharing services.

SUMMARY OF THE DETAILED DESCRIPTION

In a communication environment where a voice bearer is established between a multimedia terminal of a first user and a voice terminal of a second user to allow voice communications between the first and second users, the present invention allows the second user to gain access to video content of the first user through a web session. In a first embodiment, the voice bearer is established in response to the first user initiating a voice and video (VAV) call toward the voice terminal of the second user. The second user can initiate a web session with a service node, which will obtain information via the web session and use that information to instruct the multimedia terminal to deliver the video content of the first user to a media player that is associated with the web browser of the second user. In a second embodiment, the voice bearer is established in response to a voice only call being established between the multimedia terminal and the voice terminal. During the voice call, the second user can initiate a web session with a service node, which will obtain information via the web session and use that information to instruct the multimedia terminal to deliver the video content of the first user to a media player that is associated with the web browser of the second user.

In one configuration of the first embodiment, the first mobile user will originate a voice and video (VAV) call from a multimedia terminal to a second user, wherein the voice portion of the VAV call is established via a voice terminal of the second user and the video portion of the VAV call may be established via a web browser of the second user. The web browser may be provided on the voice terminal or on another terminal of the second user. When the VAV call is being originated, the VAV call is routed to a service node, which will facilitate establishment of a voice bearer for the voice portion of the VAV call between the multimedia terminal of the first user and the voice terminal of the second user. To gain access to the video portion of the VAV call, the second user will initiate a web session with the service node via the web browser and indicate a desire to gain access to the video portion of the VAV call. In response to the web session, the service node will identify the VAV call to which access is being requested and communicate information sufficient to allow video content for the video portion of the VAV call to be delivered to the web browser over a video bearer. The service node will provide the communication information to the multimedia terminal, which will use the communication information to stream the video content toward the web browser of the second user over the video bearer. The video content, which may be live or prerecorded, is then received and presented to the second user by a media player that is integrated with or otherwise associated with the web browser. Video content of the second user may be delivered back to the multimedia terminal from the web browser to provide a bi-directional video session in association with the voice portion of the VAV call.

The VAV call may be routed to a communication function provided by the service node. The communication function is capable of supporting multimedia signaling with the multimedia terminal, entities operating on behalf of the multimedia terminal, or the like as well as voice signaling with the voice terminal, entities operating on behalf of the voice terminal, media gateway controllers, call servers, or the like. The VAV call may be routed to the service node via the multimedia signaling, through which any further signaling for handling the VAV call in general or the voice portion of the VAV call in particular may be supported. Although not limited thereto, the multimedia signaling allows the service node to interact with the multimedia terminal or agent thereof in association with establishing and controlling the voice bearer for the voice portion as well as instructing the multimedia terminal or agent thereof to deliver video over the video bearer to the web browser. The service node may provide communication information that is sufficient to enable the multimedia terminal or agent thereof to stream or otherwise deliver the video content being provided by the first user to the web browser of the second user. The communication information may include, but is not limited to, address, port, and codec information associated with the web browser or a media player running on the web browser. For example, the multimedia terminal or an agent thereof may encode the video content according to the specific codec and stream the video content toward the web browser using the provided address and port information.

The communication function of the service node may also support voice signaling, which is used by the service node to interact with the voice terminal or agent thereof in association with establishing and controlling the voice bearer for the voice portion of the VAV call. As such, the communication function may employ both multimedia and voice signaling in association with establishing and controlling a voice bearer for the voice portion of the VAV call. Notably, the voice bearer may be provided via a packet network, circuit-switched network, or a combination thereof, wherein the multimedia and voice signaling are used according to the configuration requirements of the desired voice bearer, as will be appreciated by those skilled in the art.

The service node may also provide a web server function to support web sessions with web browsers and an interworking function to facilitate the interaction between the web server function and the communication function. The web server function allows the service node to appear as a web server to the web browser and support normal web server functionality, such as responding to a web browser's requests for content and providing web pages or updates for web pages with the requested content using an appropriate web session protocol, such as the Hyper-Text Transfer Protocol (HTTP) as set forth in the Internet Engineering Task Force's (IETF) Request For Comments (RFC) 2616. The interworking function of the service node provides for the control of the communication and web server functions as well as the interaction between the communication and web server functions as described herein.

The communication function of the service node may appear as a VAV capable terminal that is associated with the second user or address thereof and is capable of handling the voice and video portions of the VAV call. The VAV call originated by the multimedia terminal is effectively routed to the communication function, which will operate to establish the voice bearer for the voice portion of the call and wait for the second user to request access to the video portion of the VAV call via a separate web session prior to having the multimedia terminal provide video content in association with the VAV call. Once the second user initiates the web session via the web browser and requests access to the video portion of the VAV call, the service node will instruct the multimedia terminal to begin providing the video content to the media player associated with the web browser. From the perspective of the multimedia terminal, the VAV call is a normal VAV call that has associated voice and video portions and is provided to a single user terminal, which is capable of supporting both the voice and video portion of the VAV call as part of the VAV call. The multimedia terminal need not be aware of the web session or that the destination of the video content is a media player associated with a web browser instead of the same communication agent that is handling the voice portion of the VAV call.

In one configuration of the second embodiment, a video portion is added to an existing voice call, which was initiated as a voice only call and was established at least in part over a circuit-switched connection between the multimedia terminal and the voice terminal. After the voice bearer for the voice call is established, the service may establish a web session with the web browser of the second user in which a desire of the second user to add a video portion to the existing voice call is determined. The web session may be initiated by the second user in response to the conversation with the first user. Via the web session, the service node may obtain session information associated with the multimedia terminal and at least a portion of communication information sufficient to deliver the first video content to a media player that is associated with the web browser. Based on the session information, the service node may identify the multimedia terminal that is supporting the existing voice call, and then provide instructions for the multimedia terminal to augment the existing voice call with the video portion such that the multimedia terminal can deliver video content via the video portion to the media player of the web browser using the communication information.

Those skilled in the art will appreciate the scope of the present invention and realize additional aspects thereof after reading the following detailed description in association with the accompanying drawings.

BRIEF DESCRIPTION OF THE DRAWINGS

The accompanying drawings incorporated in and forming a part of this specification illustrate several aspects of the invention, and together with the description serve to explain the principles of the invention.

DETAILED DESCRIPTION

The embodiments set forth below represent the necessary information to enable those skilled in the art to practice the invention and illustrate the best mode of practicing the invention. Upon reading the following description in light of the accompanying drawings, those skilled in the art will understand the concepts of the invention and will recognize applications of these concepts not particularly addressed herein. It should be understood that these concepts and applications fall within the scope of the disclosure and the accompanying claims.

Figure 1:
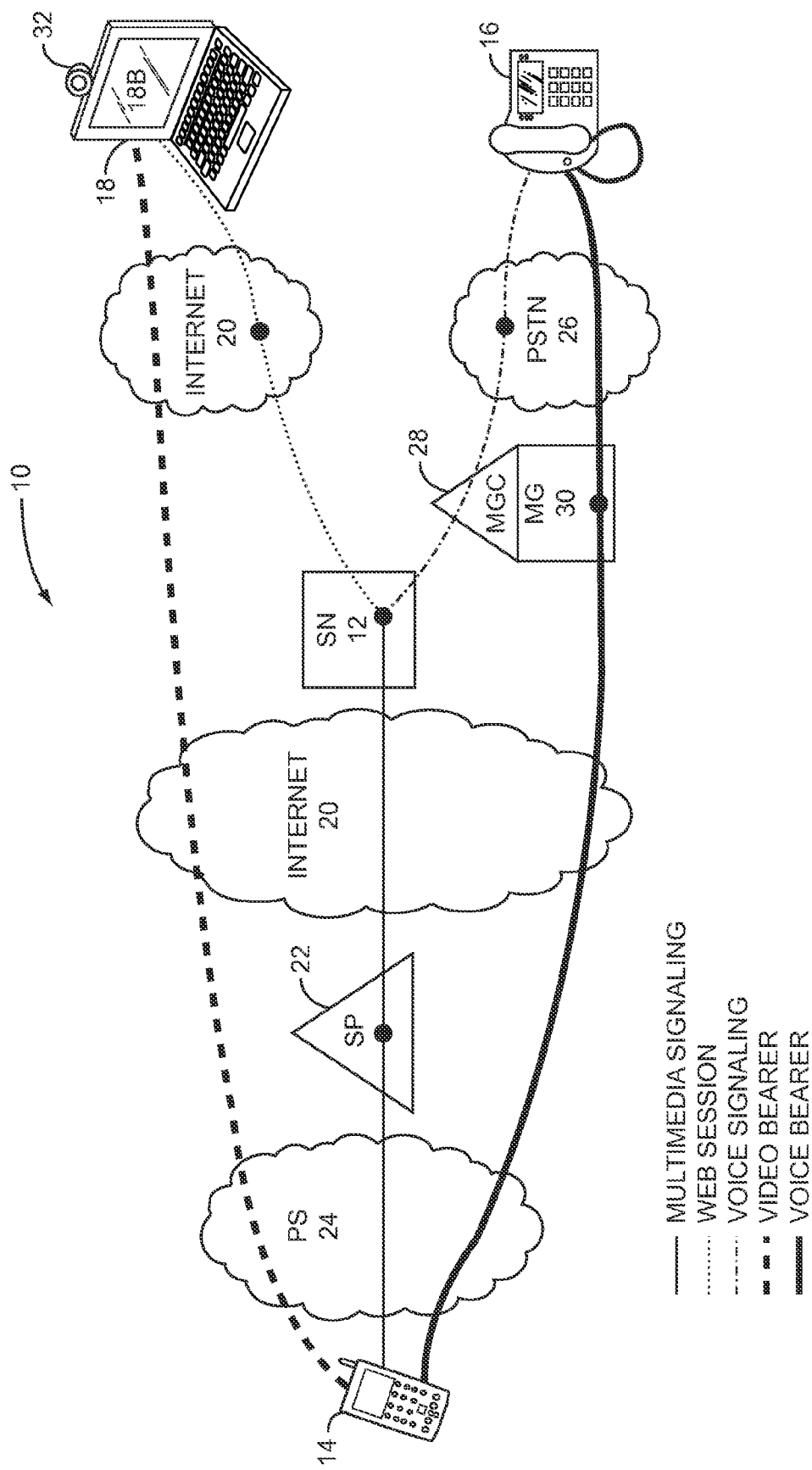
FIG. 1 is a block representation of a communication environment according to one embodiment of the disclosure.
Figure 2A:
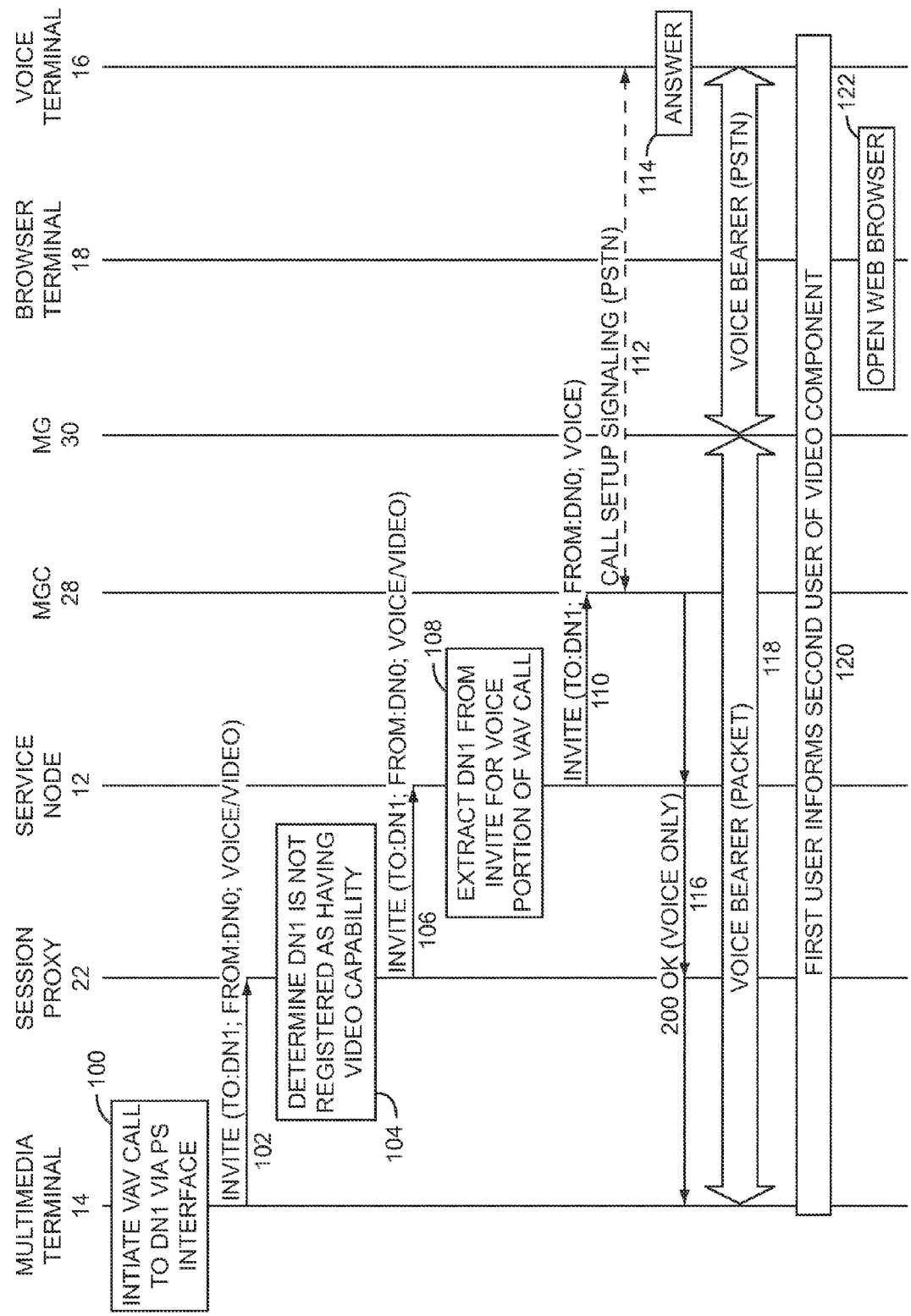
FIGS. 2A through 2D provide an exemplary communication flow according to one embodiment of the disclosure.
Figure 2B:
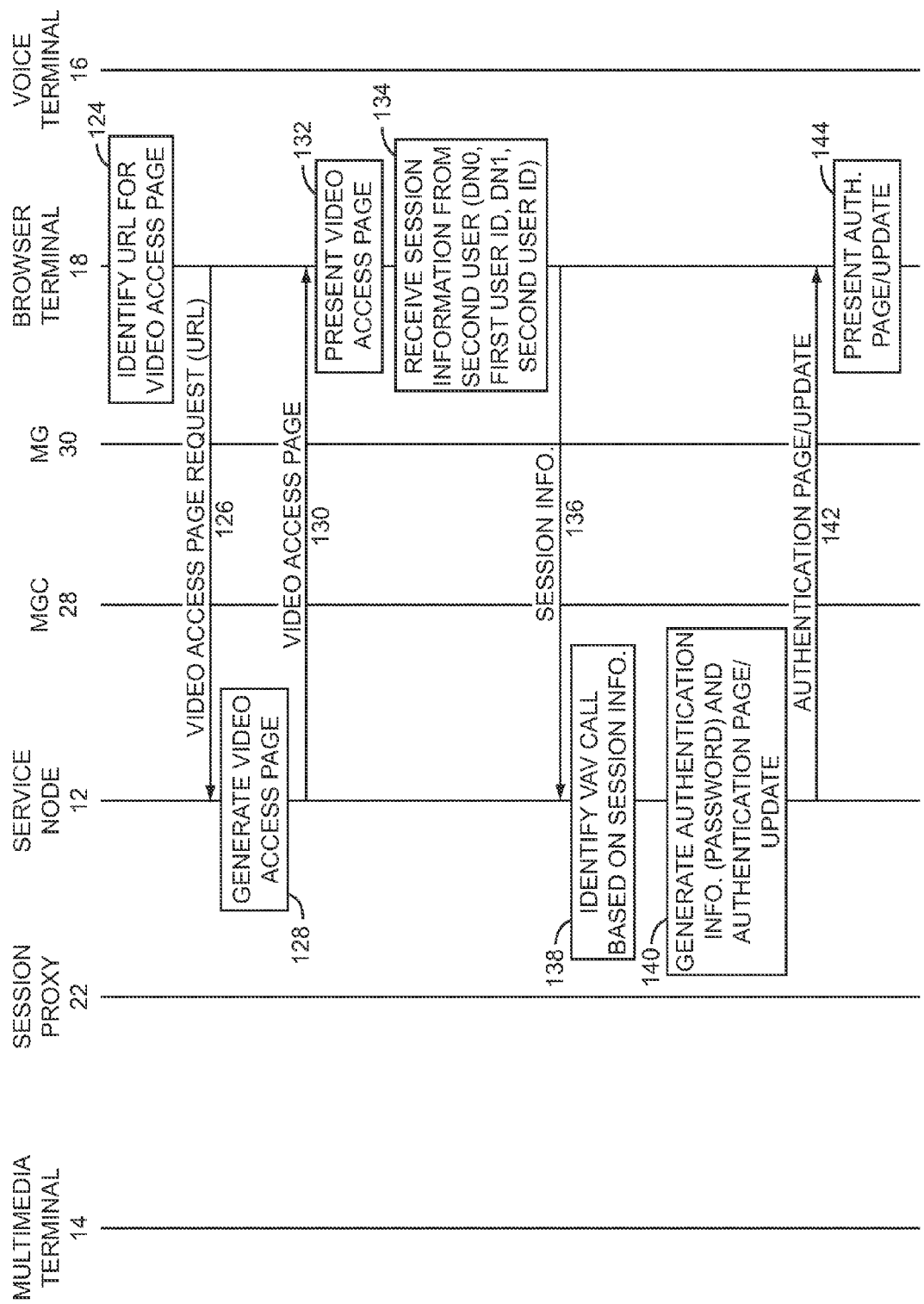
Figure 2C:
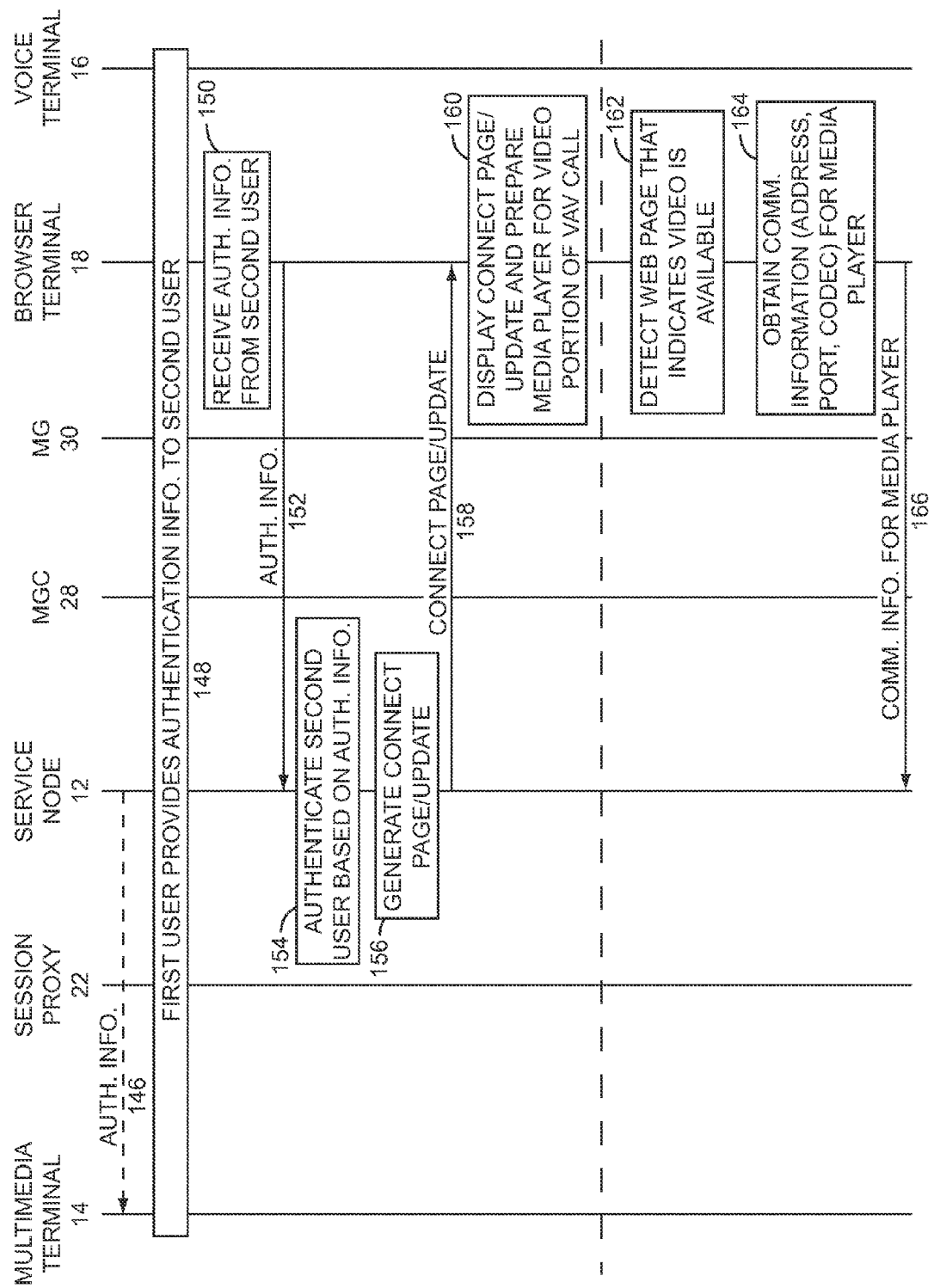
Figure 2D:
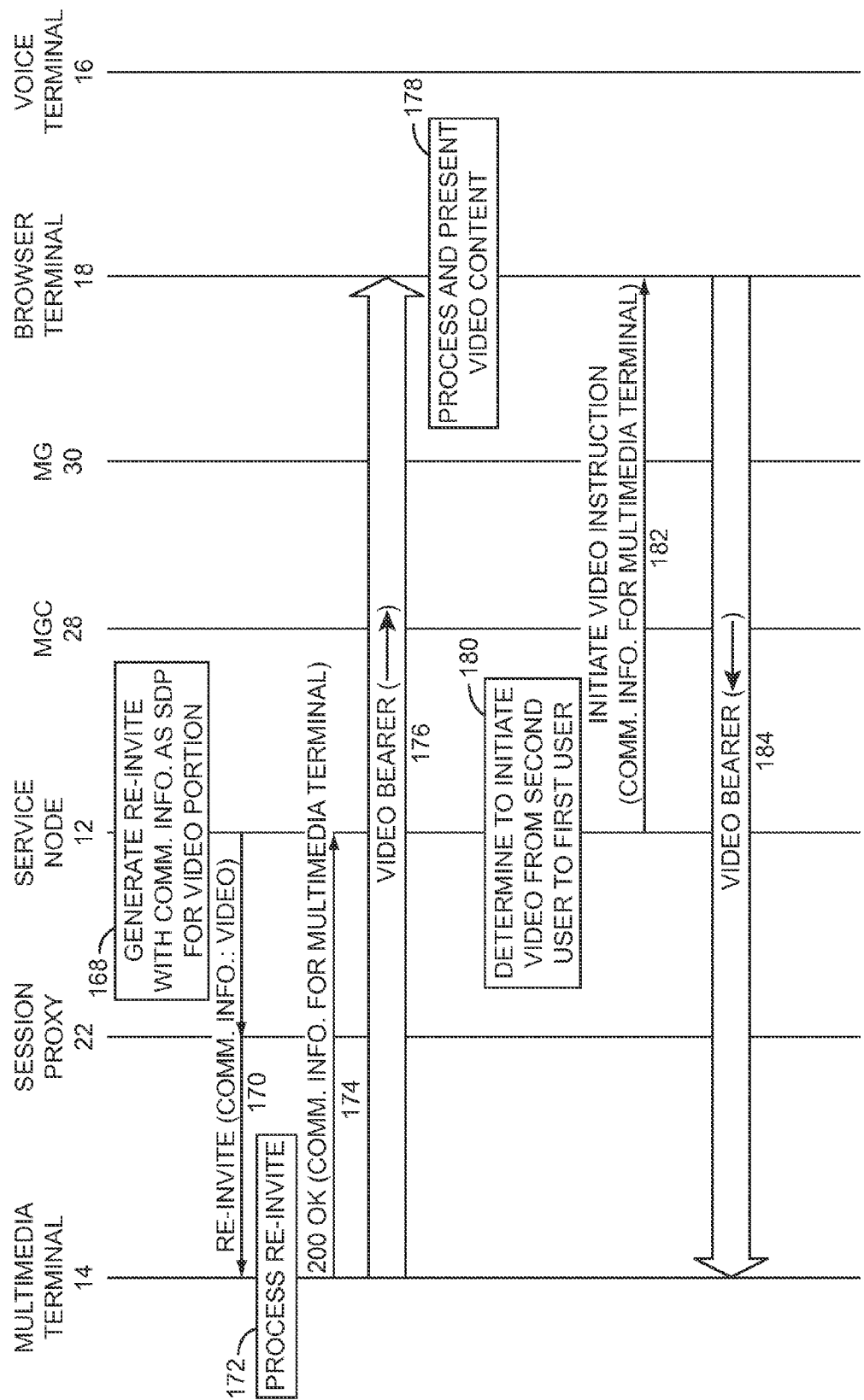

Prior to delving into the details of select embodiments, an overview of an exemplary communication environment 10 is provided in association with FIG. 1. In general, a service node 12 is provided to facilitate communications among a multimedia terminal 14, voice terminal 16, and a web browser 18B, which may be provided on the voice terminal 16 or on a separate browser terminal 18. Notably, the various terminals may take virtually any form, including wired or wireless telephones, personal computers, personal digital assistants, and the like. The labels provide for these terminals in this description and the following claims are used only to improve readability and separately identify the terminals. As such, any of the terminals (14, 16, 18) may support a limited or full range of multimedia applications and communications, including voice. Alternatively, the voice terminal 16 may support primarily voice communications applications through packet or circuit switched connections.

In general, one embodiment of the present invention allows a first mobile user who is associated with the multimedia terminal 14 to originate a voice and video (VAV) call from the multimedia terminal 14 toward a second user using a communication address associated with the second user in general or the voice terminal 16 in particular. The communication address may be a directory number or packet communications address, such as a Session Initiation Protocol (SIP) uniform resource locator (URL). When the communication address or terminal to which the VAV call is directed is not capable of supporting the video portion of the VAV call, the VAV call is routed to the service node 12 for processing. When the VAV call is originated by the multimedia terminal 14, it may be initially routed to a session proxy (SP) 22, which will make the determination as to whether the address or terminal to which the VAV call is directed can support the video portion of the VAV call. If the session proxy 22 determines that the address or terminal to which the VAV call is directed can support the both the voice and video portions of the VAV call, the session proxy 22 will route the call in traditional fashion toward the designated communication address or terminal. If the session proxy 22 determines that the address or terminal to which the VAV call is directed cannot support the video portion of the VAV call, the session proxy 22 will route the call to the service node 12 for processing. In the embodiment of FIG. 1, the multimedia terminal 14 is served via a packet-based access subsystem (PS) 24, which is coupled directly or indirectly to the Internet 20 and provides access to the session proxy 22. The session proxy 22 and service node 12 may communicate via the Internet.

In this example, assume VAV call is directed to the voice terminal 16, which is not capable of supporting the video portion of the VAV call. When the VAV call is routed to the service node 12, the service node 12 will operate to establish the voice portion of the VAV call with the voice terminal 16. As will be described further below, the video portion of the VAV call for the second user may be subsequently established via the web browser 18B, which as indicated above, may be provided on the voice terminal 16 or on the browser terminal 18 of the second user. When the VAV call is routed to the service node 12 by the session proxy 22, the service node 12 will facilitate establishment of a voice bearer for the voice portion of the VAV call between the multimedia terminal 14 of the first user and the voice terminal 16 of the second user. As illustrated, the VAV call is routed to the service node 12 via the session proxy 22 via multimedia signaling, which provides the signaling mechanism for the service node 12 to establish and control both the voice and video portions of the VAV call with respect to the multimedia terminal 14 as well as exchange information with the multimedia terminal 14.

Assuming the voice terminal 16 is served by the public switched telephone network (PSTN) 26, the service node 12 may employ separate voice signaling to establish and control the voice portion of the VAV call. Through the multimedia signaling and the voice signaling, the service node 12 is able to facilitate establishment of the voice bearer that will support the voice portion of the VAV call between the multimedia terminal 14 and the voice terminal 16. As illustrated, the service node 12 is able to communicate via the voice signaling with a media gateway controller (MGC) 28, which operates to control a media gateway 30. The service node 12 will instruct the multimedia terminal 14 or an agent thereof and the MGC 28 to establish the voice bearer for the voice portion of the VAV call between the multimedia terminal 14 and the voice terminal 16 via the media gateway 30. In this example, the voice bearer is established through the media gateway 30 under control of the MGC 28, wherein the voice bearer has a packet portion between the multimedia terminal 14 and the media gateway 30 through the PS 24 and the Internet 20 and a circuit switched portion between the media gateway 30 and the voice terminal 16 via the PSTN 26.

The first and second users may talk with each via the voice bearer; however, the video portion of the VAV call has yet to be established. Prior to initiating the VAV call or once the voice bearer is established, the first user may inform the second user that there is a video portion associated with the voice portion of the VAV call. To gain access to the video portion of the VAV call, the second user will open the web browser 18B and initiate a web session by navigating to a web site that is associated with a service that will allow the user to gain access to the video portion of the VAV call. The second user may navigate to the web site using a specific URL that was provided by the user and associated with the particular VAV call or VAV calls that are have been initiated by the user. An exemplary specific URL may be http://video.carrier.com/?DN0, wherein DN0 is the directory number associated with the multimedia terminal 14. Alternatively, the second user may navigate to the web site using a general URL that is associated with the service that allows users to gain access to video portions of VAV calls, wherein the second user may provide sufficient information to identify the particular VAV call to which access is desired. An exemplary general URL may be http://video.carrier.com, which is associated with a general page that allows the user to identify the VAV call by providing the directory number DN0 or other identification information sufficient to allow the service node 12 to associate the web session with the VAV call that has been initiated by the first user. The desire to gain access to the video portion of the VAV call may be determined based on initiation of the web session or by the second user providing a specific request, information, or instructions to do so.

In response to the web session, the service node 12 will identify the VAV call to which access is being requested and obtain communication information sufficient to allow video content for the video portion of the VAV call to be streamed to the web browser 18B over the video bearer. All or portions of the communication information may have been previously stored on the service node 12 or obtained from the second user, the web browser 18B, the media player associated with the web browser 18B, the browser terminal 18, a third party, or any combination thereof. Although the type and content of the communication information may vary from one embodiment to another, the communication information should be sufficient to enable the multimedia terminal 14 or agent thereof to stream or otherwise deliver the video content being provided by the first user to the web browser 18B. The communication information may include address, port, and codec information associated with the web browser 18B or the media player running with the web browser 18B. For example, the multimedia terminal 14 or an agent thereof may encode the video content according to a specific codec and stream the video content toward the web browser 18B using the provided address and port information.

The service node 12 will provide the communication information to the multimedia terminal 14 or an agent thereof, which will use the communication information to stream the video content toward the web browser 18B of the second user over the video bearer. The communication information may be provided by the service node 12 toward the multimedia terminal 14 in or in association with instructions to start the video portion of the VAV call, and thus begin delivery of the video content toward the web browser 18B. The video content, which may be live or prerecorded, is then received and presented to the second user by a media player that is integrated with or otherwise associated with the web browser 18B. As such, the video content may be effectively provided to the second user with or in conjunction with the web session. Video content of the second user may be delivered back to the multimedia terminal 14 or an agent thereof from the web browser 18B to provide a bi-directional video session in association with the voice portion of the VAV call. The video content that is provided back to the first user may be live or recorded video content, which may have been captured by a video camera 32 of the browser terminal 18.

In general, the service node 12 may provide a communication function, web server function, and an interworking function. When originated, the VAV call may be routed to the communication function provided by the service node 12. The communication function is capable of supporting multimedia signaling with the multimedia terminal 14, entities operating on behalf of the multimedia terminal 14, or the like as well as voice signaling with the voice terminal 16, entities operating on behalf of the voice terminal 16, media gateway controllers 28, call servers (not shown), or the like. In one embodiment, the VAV call may be routed to the service node 12 via the multimedia signaling, which may support any further signaling necessary for handling the VAV call in general or the voice portion of the VAV call in particular. Although not limited thereto, the multimedia signaling allows the service node 12 to interact with the multimedia terminal 14 or agent thereof in association with establishing and controlling the voice bearer for the voice portion as well as instructing multimedia terminal 14 or agent thereof to deliver video over a video bearer to the web browser 18B.

The communication function may also support voice signaling, which is used by the service node 12 to interact with the voice terminal 16 or agent thereof, such as the MGC 30 or a call server, in association with establishing and controlling the voice bearer for the voice portion of the VAV call. As such, the communication function of the service node 12 may employ both multimedia and voice signaling in association with establishing and controlling a voice bearer for the voice portion of the VAV call. Notably, the voice bearer may be provided via the PS 24, PSTN 26, or a combination thereof, wherein the multimedia and voice signaling are used according to the configuration requirements of the desired voice bearer, as will be appreciated by those skilled in the art.

The web server function of the service node 12 supports web sessions with the web browser 18B, and the interworking function of the service node 12 facilitates the interaction between the web server function and the communication function. The web server function allows the service node 12 to appear as a web server to the web browser 18B and support normal web server functionality, such as responding to a web browser's requests for content and providing web pages or updates for web pages with the requested content using an appropriate web session protocol, such as the Hyper-Text Transfer Protocol (HTTP) as set forth in the Internet Engineering Task Force's (IETF) Request For Comments (RFC) 2616. The interworking function of the service node 12 provides control of the communication and web server functions as well as the interaction between the communication and web server functions.

In one embodiment, the communication function of the service node 12 appears as or otherwise represents a VAV capable terminal that is associated with the second user or an address thereof and is capable of handling the voice and video portions of the VAV call. The VAV call originated by the multimedia terminal 14 is effectively routed to the communication function, which will operate to establish the voice bearer for the voice portion of the call and wait for the second user to request access to the video portion of the VAV call via a separate web session prior to having the multimedia terminal 14 provide video content in association with the VAV call. Once the second user initiates the web session via the web browser 18B and requests access to the video portion of the VAV call, the service node 12 will instruct the multimedia terminal 14 to begin providing the video content to the media player associated with the web browser 18B. From the perspective of the multimedia terminal 14, the VAV call is a normal VAV call that has associated voice and video portions and is provided to a single user terminal, which is capable of supporting both the voice and video portion of the VAV call. The multimedia terminal 14 need not be aware of the web session or that the destination of the video content is a media player associated with the web browser 18B instead of the same communication client that is handling the voice portion of the VAV call.

With reference to FIGS. 2A through 2D, a communication flow is provided to illustrate an exemplary scenario for allowing the second user to gain access to the video portion of a VAV call using a web browser 18B. Those skilled in the art will recognize that this is only an exemplary scenario according to one embodiment of the present invention, and the aspects and elements represented in the communication flow are not all deemed necessary for implementation of the present invention. In particular, the communication flow is intended to illustrate numerous optional aspects and features that are supplemental to the core concepts of the present invention. For this scenario, assume that the second user or the voice terminal 16 is associated with a directory number DN1, while the first user or the multimedia terminal 14 is associated with a directory number DN0.

At some point, the first user decides to initiate a VAV call from the multimedia terminal 14 using the directory number DN1. Accordingly, the first user will instruct the multimedia terminal 14 to make the VAV call, and as such, the multimedia terminal 14 will initiate the VAV call toward directory number DN1 (step 100). In this scenario, assume the communication environment 10 is being used, and since the multimedia terminal 14 is supported by the PS 24, the call is initiated via a corresponding PS interface. Further assume that the Session Initiation Protocol (SIP) is used for session signaling and control; however, those skilled in the art will recognize that other session signaling protocols may be employed.

To initiate the VAV call, the multimedia terminal 14 will send a SIP invite that is intended for directory number DN1 to the session proxy 22 (step 102). The invite may also include the directory number DN0 for the multimedia terminal 14 as well as an indication that the invite is for a VAV call, which includes voice and video portions. The session proxy 22 may keep a record of or access an appropriate database to determine whether the directory number DN1 is registered in association with a user terminal having video capability, and in particular a user terminal that can support the video portion of the VAV call. In this example, the voice terminal 16 is not capable of supporting the video portion of the VAV call in typical fashion, and the session proxy 22 will determine that the directory number DN1 is not registered with a device having video capability (step 104).

When the session proxy 22 determines that the directory number DN1 is not registered as having video capability, the VAV call is effectively redirected to the service node 12 instead of being processed in normal fashion. As such, the session proxy 22 will forward the invite to the service node 12 to effectively reroute the VAV call to the service node 12 (step 106). Notably, the routing of the VAV call, and in particular the invites associated with initiating the VAV call, are provided via the multimedia signaling. Upon receipt of the invite, the service node 12 will extract the directory number DN1 from the invite and use the directory number DN1 to establish the voice portion of the VAV call (step 108). In essence, the service node 12 is determining the appropriate user terminal, in this case the voice terminal 16, with which a voice bearer should be established to support the voice portion of the VAV call. Since the voice terminal 16 is supported by the PSTN 26, the service node 12 will modify the invite to indicate that it is only being used to initiate a voice session, and then send the invite to the media gateway controller 28, which is capable of serving the voice terminal 16 (step 110). In response to receiving the invite, the media gateway controller 28 will facilitate the necessary call setup signaling with any appropriate telephony switches or other media gateways in the PSTN 26 to facilitate presentation of a voice call, which corresponds to the VAV call, to the voice terminal 16 through the PSTN 26 (step 112).

When the second user answers the voice call (step 114), the media gateway controller 28 is informed through the call setup signaling. The media gateway controller 28 will provide a 200 OK message back toward the multimedia terminal 14 through the service node 12 and the session proxy 22 to indicate that the voice call has been answered, and provide the requisite communication information to allow the multimedia terminal 14 to communicate with the media gateway 30 (step 116). As such, the multimedia terminal 14 recognizes that only the voice portion of the VAV call has been established. Through any signaling exchange between the multimedia terminal 14 and the media gateway controller 28 via the service node 12 and the session proxy 22, the multimedia terminal 14 will have sufficient communication information to deliver voice content to the media gateway 30, and the media gateway 30 will have sufficient communication information to be able to deliver voice content to the multimedia terminal 14 over a packet portion of the voice bearer. The call setup signaling will facilitate a circuit-switched, or PSTN, portion of the voice bearer between the media gateway 30 and the voice terminal 16 through the PSTN 26. Together, the packet and PSTN portions of the voice bearer are interworked at the media gateway 30 to provide an overall voice bearer that is sufficient to allow the first and second users to talk to one another (step 118). Notably, those skilled in the art will recognize that additional signaling may be required or provided in traditional fashion to establish the respective portions of the voice bearer, and any information that must be exchanged between the respective entities may be provided in different ones of the call signaling messages.

In this example, assume that during the conversation between the first and second users, the first user informs the second user that there is a video component available in association with the voice session (step 120). While talking with the first user via the voice terminal 16, the second user may interact with the browser terminal 18 and open the web browser 18B (step 122). The web browser 18B will identify a URL to use for accessing a video access page, which will help the user gain access to the video portion of the VAV call (step 124). The URL may be stored by the web browser 18B, or may be provided by the second user. In this example, assume the URL is provided to the second user by the first user, and the second user enters the URL into the web browser 18B, which subsequently sends a video access page request using the URL to the service node 12 (step 126). Assume that the video access page request effectively initiates a web session with the web server function of the service node 12. In response to the video access page request, the service node 12 will generate an appropriate video access page (step 128) and send the video access page to the web browser 18B of the browser terminal 18 (step 130). The web browser 18B will present the video access page to the second user (step 132), and in this example, receive session information from the second user (step 134). Session information may, but need not, include identification for the first or second users (first user ID and second user ID), as well as the directory numbers associated with the VAV call (DN0 and DN1). The session information may be provided to the service node 12 through dedicated or other messaging during the web session (step 136). The service node 12 may identify the VAV call in which the second user is interested based on the session information provided by the second user, the URL used to initiate the web session, or other appropriate information (step 138).

The service node 12 may require authentication of the second user prior to granting access to the video portion of the VAV call. In one embodiment, the service node 12 may generate authentication information, such as a password or access code, as well as an authentication page or update (step 140). The authentication page or update may be a web page or an update to the video access page, and provides a request for the second user to enter the authentication information, such that the second user may be authenticated prior to allowing the second user to gain access to the video portion of the VAV call. The authentication page or update may be provided to the web browser 18B of the browser terminal 18 (step 142), which will present the authentication page or update to the second user (step 144). Notably, the authentication page or update will not include the authentication information. Instead, the service node 12 will effect delivery of the authentication information to the first user in any available manner (step 146). For example, the service node 12 may send the authentication information to the multimedia terminal 14 through a Short Messaging Service (SMS) message, instant message, Multimedia Messaging Service (MMS) message, email, or the like. The multimedia terminal 14 will receive the authentication information from the service node 12 and present it to the first user.

The first user may provide the authentication information to the second user via the voice portion of the VAV call or using an appropriate messaging technique, such as SMS, MMS, instant messaging, or email (step 148). The authentication information need not be generated and delivered to the multimedia terminal 14, or the first user in general, in a dynamic fashion. Prior to the VAV call, the authentication information may be generated and shared with the second user. Regardless of how the authentication information is received by the second user, the second user will provide the authentication information to the web browser 18B, such as by entering the authentication information into an appropriate field provided in the authentication page or update. Upon receiving the authentication information from the second user (step 150), the web browser 18B of the browser terminal 18 will present the authentication information to the service node 12 via a web session message (step 152). The service node 12 will extract the authentication information and authenticate the second user based on the authentication information (step 154). If the second user is not authenticated, access to the video portion of the VAV call is denied. If the second user is authenticated, the service node 12 will generate a connect page or update (step 156) and send the connect page or update to the browser terminal 18 (step 158). The connect page or update may inform the second user that the process for connecting to the video portion of the VAV call is in progress, as well as provide instructions for the media player that is associated with the web browser 18B to prepare for participating in the video portion of the VAV call (step 160).

Through any one of the web pages or updates described above or another web page or update, the web browser 18B will detect that a web page that is provided by the service node 12 has an indication that video is available (step 162). In this example, the connect page or update may provide an indication that video is available in association with the web page. The web browser 18B of the browser terminal 18 will obtain the communication information, such as the address, port, and codec, for the media player associated with the web browser 18B (step 164), and send the communication information for the media player to the service node 12 via the web session (step 166).

When the service node 12 determines that access to the voice portion of the VAV call is appropriate and that communication information for the media player has been received, the service node 12 will generate a SIP re-invite with the communication information for the media player provided in the Session Data Protocol (SDP) for the video portion of the VAV call (step 168). The SDP of the re-invite provides sufficient communication information, such as the address, port, and codec, to use for delivering the video content for the video portion of the VAV call to the media player of the web browser 18B. The re-invite for the video portion of the VAV call is sent to the multimedia terminal 14 via the session proxy 22 (step 170), wherein the multimedia terminal 14 will process the re-invite (step 172) and initiate the multimedia terminal 14 to provide video content for the video portion of the VAV call. In response to the re-invite, the multimedia terminal 14 may provide a 200 OK or other message with the communication information for the multimedia terminal 14 (step 174). This communication information may identify the address, port, and codec of the multimedia terminal 14 and is used by the browser terminal 18 for delivering video content back to the multimedia terminal 14 in association with the voice portion of the VAV call, if bi-directional video is desired.

Armed with the communication information for the media player of the web browser 18B, the multimedia terminal 14 may begin delivering video content for the video portion of the VAV call over the video bearer to the media player of the web browser 18B (step 176). The web browser 18B of the browser terminal 18 may process and present the video content to the second user (step 178). If and when bi-directional video is desired, the service node 12 may determine to initiate the delivery of video from the second user to the first user in response to an instruction from the second user via the web session, or the like (step 180). The service node 12 may send an instruction to initiate the delivery of video to the web browser 18B (step 182). The instruction may include the communication information for the multimedia terminal 14, and as such, the browser terminal 18 will be able to send select video content, whether recorded or live, to the multimedia terminal 14 over the video bearer using the communication information provided by the service node 12 (step 184). The video content being provided by the browser terminal 18 may be obtained from the camera 32, and may represent live video being recorded concurrently with the VAV call or video that was prerecorded. In addition to video being provided between the first and second users, other media, such as photos and the like, may be exchanged instead of or in association with the video content.

Figure 3:
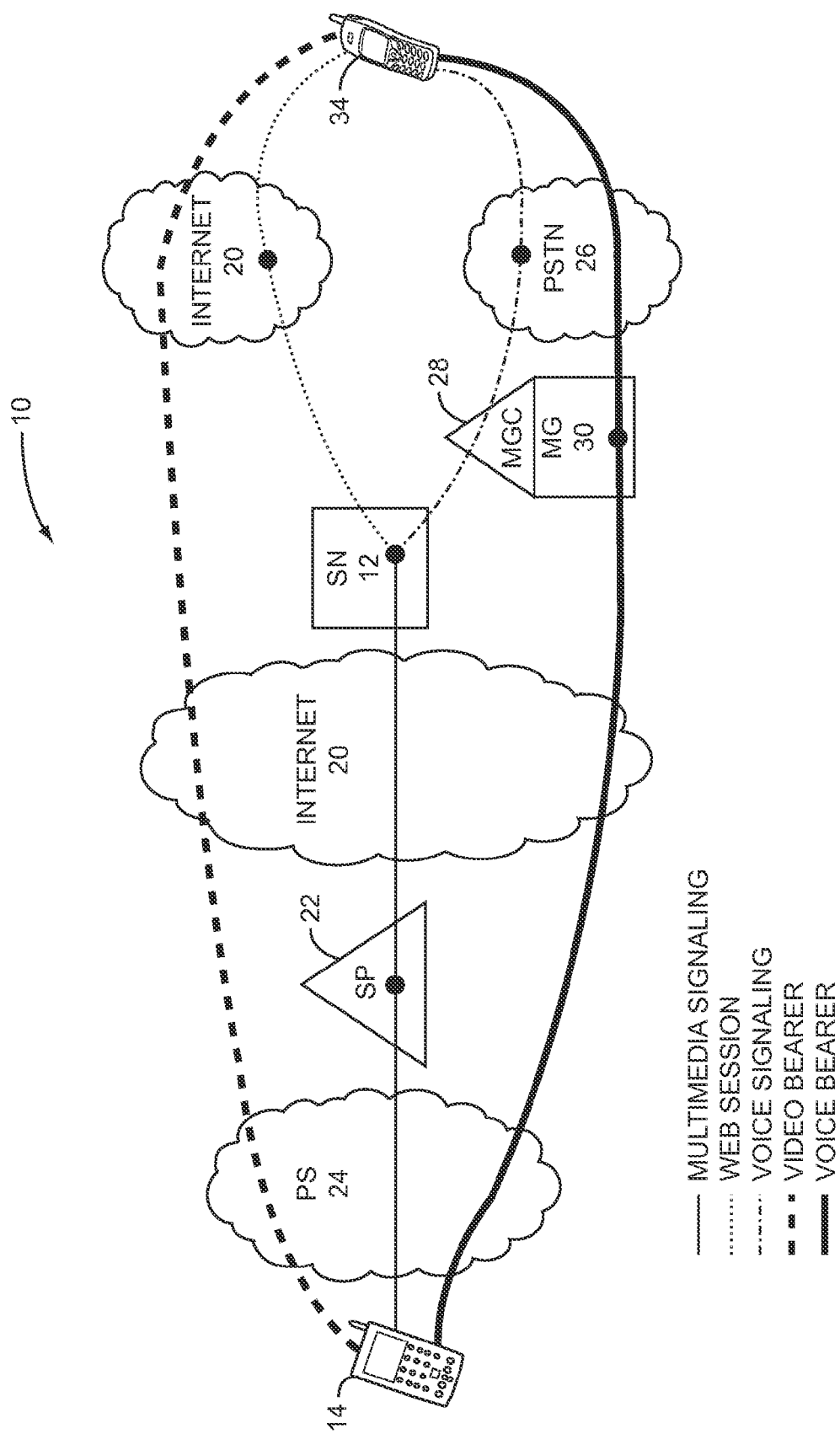
FIG. 3 is a block representation of a communication environment according to a second embodiment of the disclosure.
Figure 4:
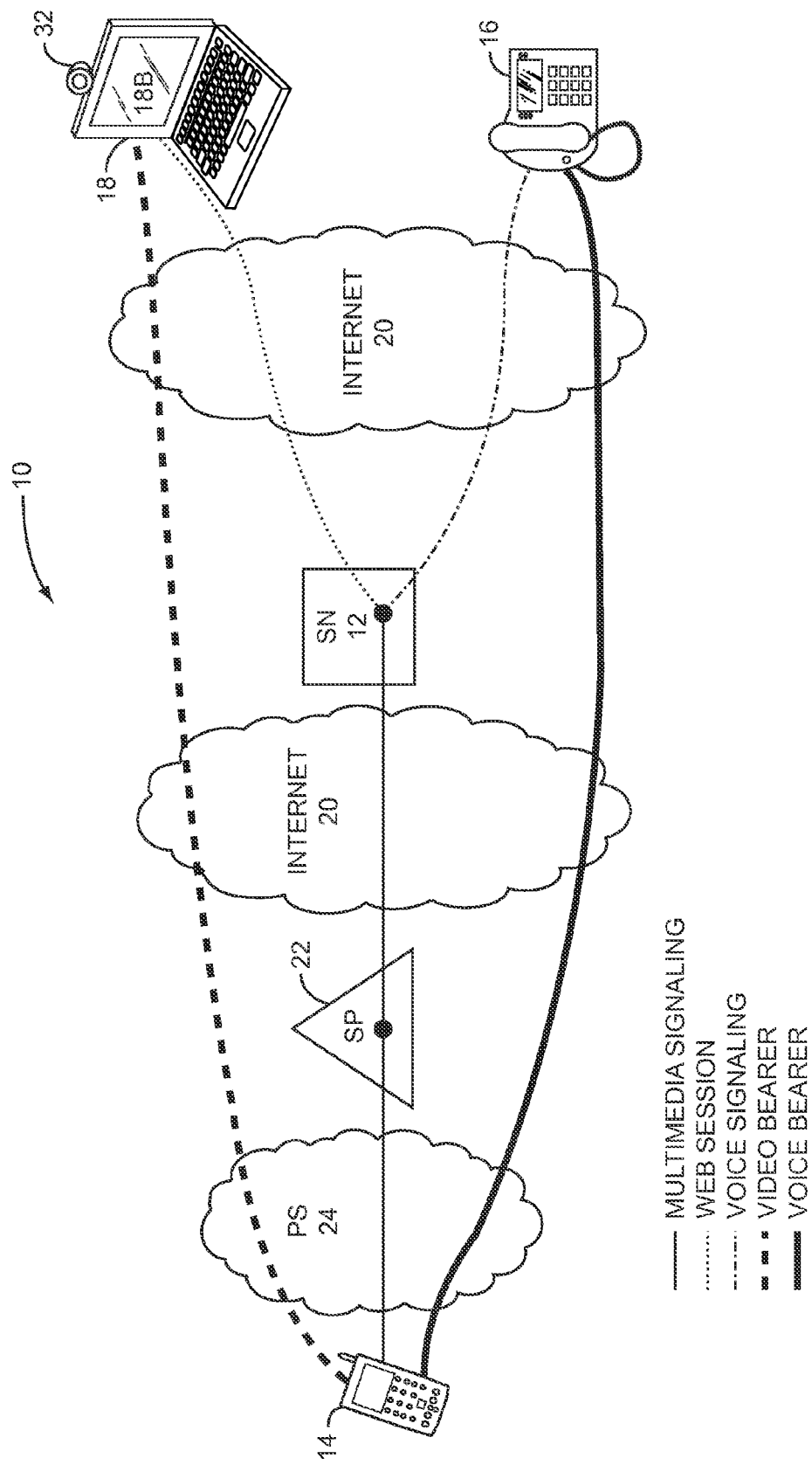
FIG. 4 is a block representation of a communication environment according to a third embodiment of the disclosure.

As illustrated in the embodiments described above, the voice portion of the VAV call is supported by the voice terminal 16, while the video portion is supported by the web browser 18B of the browser terminal 18, which is separate from the voice terminal 16. As illustrated in FIG. 3, a voice terminal 34 may include the capability to support certain types of media, but may not be fully compatible with the multimedia terminal 14 or a service provider that facilitates video calls that have voice and video components. For example, the voice terminal 34 may be able to support cellular communications through the PSTN 26 as well as support access to the Internet 20 through an appropriate packet-based access mechanism like those provided in third and fourth generation mobile communication systems. With such a configuration, the voice terminal 34 is capable of supporting a voice session via the PSTN 26 and a web session via the Internet 20, as illustrated in FIG. 3. The video bearer may be provided to a media player that is associated with the web browser 18B, which resides on the voice terminal 34, and accessed via a web session as described above. Although the voice bearer is provided to the voice terminal 16, 34 through the PSTN 26 in FIGS. 1 and 3, the voice bearer may be provided over a packet network, such as the Internet 20, as illustrated in FIG. 4, for the voice terminal 16, 34. Accordingly, the Internet 20 may support all or at least a portion of the voice and video bearers, as well as the web session through which access to the video portion of the VAV call is provided.

Figure 5:
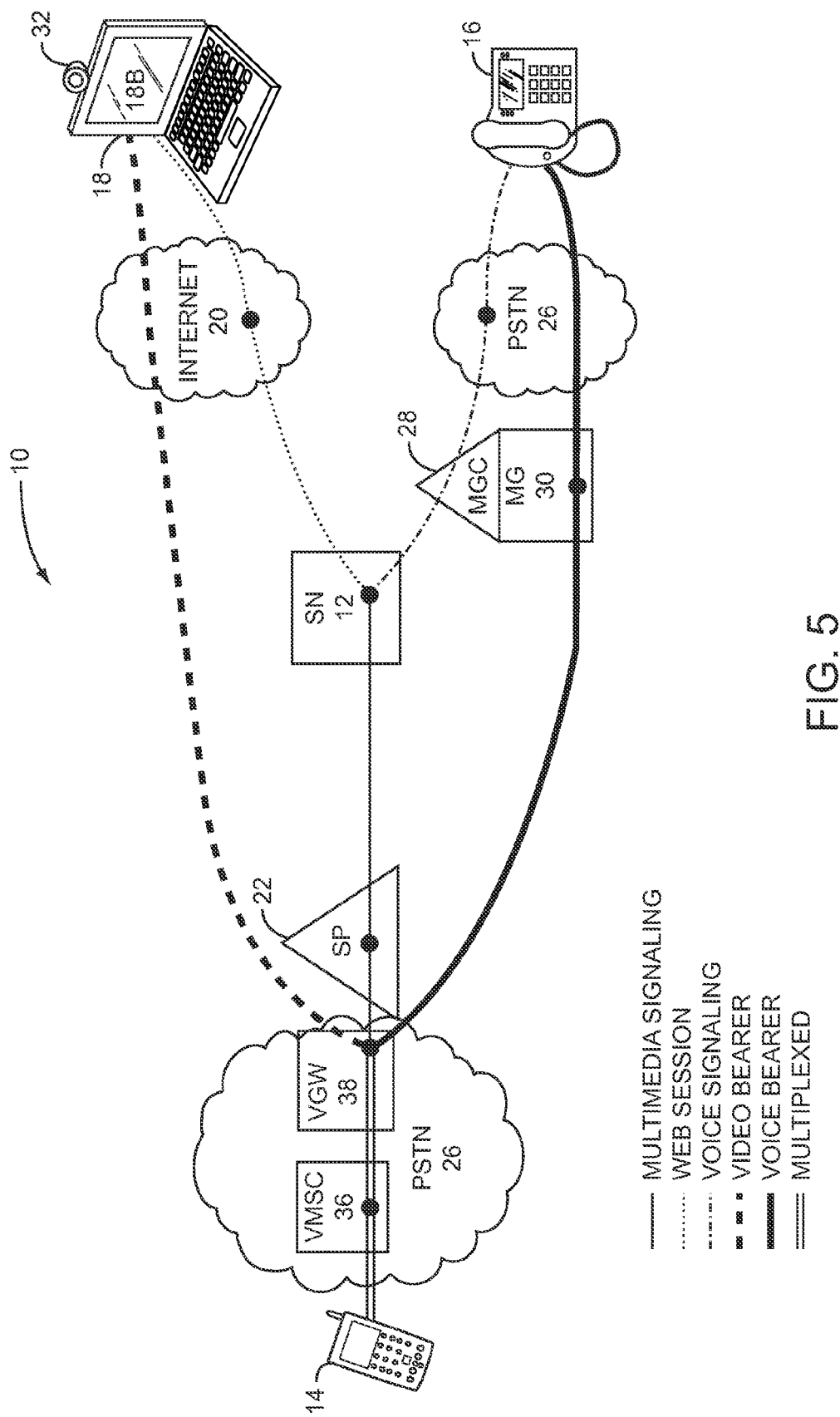
FIG. 5 is a block representation of a communication environment according to a fourth embodiment of the disclosure.

As illustrated in FIG. 5, the multimedia signaling, and at least a portion of the voice and video bearers, may be multiplexed over a circuit-switched connection provided by the PSTN 26 for the multimedia terminal 14. For example, the 3GPP (3rd Generation Partnership Project) standards organization has set forth standards for multiplexing voice, video, and data transmissions over traditional analog phone lines or wireless connections that are provided by the PSTN 26. An exemplary standard is the 3G-324M standard that multiplexes voice, video, and data for transmission over circuit switched connection, wherein an H.236 codec is used for video encoding and AMR codec is used for audio encoding. The multiplexed connection will effectively extend between the multimedia terminal 14 through a visited mobile switching center (VMSC) 36 to a video gateway (VGW) 38. The video gateway 38 will interwork the multiplexed connection with the multimedia terminal 14 and the various entities in the communication environment 10. For example, the multimedia signaling is provided through the session proxy 22 to the service node 12. The voice and video bearers are separated and routed accordingly, and in this example, via the PSTN 26 and the Internet 20, respectively, to the voice terminal 16 and the browser terminal 18.

Figure 6:
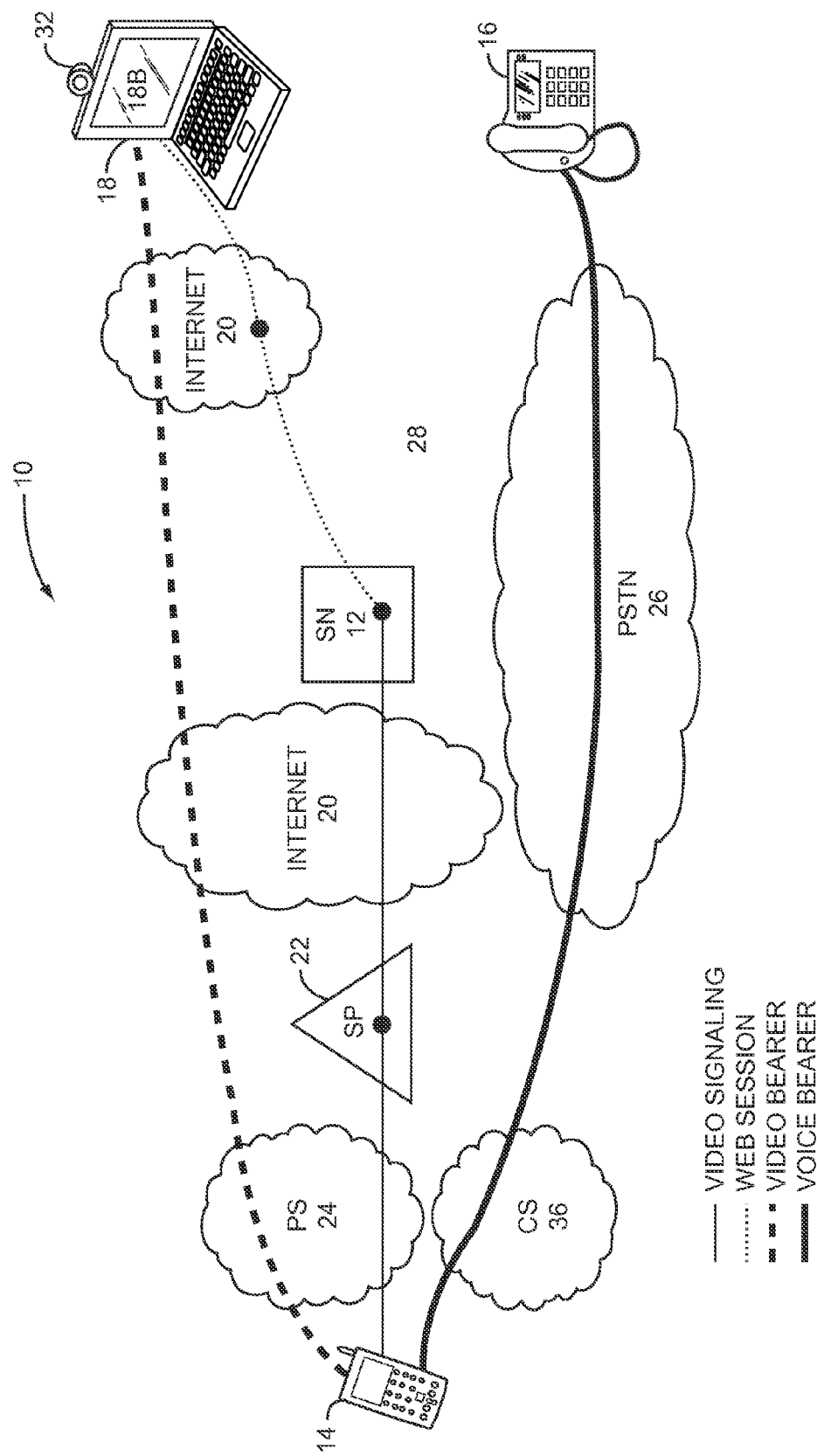
FIG. 6 is a block representation of a communication environment according to a fifth embodiment of the disclosure.

In another embodiment of the present invention, instead of having the multimedia terminal 14 initiating a VAV call, a basic voice call may be originally initiated by either of the first and second users and established via the PSTN 26. A video session can be subsequently established and associated with the voice call to provide a VAV call, at least from the perspective of the multimedia terminal 14. As provided in the illustrated example of FIG. 6, the multimedia terminal 14 may be served by the PS 24 as well as a circuit-switched subsystem (CS) 36, wherein the voice call is established via the CS 36 and the video session for the video portion is established via the PS 24. Access to the video portion is initiated by the second user through a web session in a fashion similar to that described above. As an example, the multimedia terminal 14 may use the 3GPP standard TR23.279, Combining Circuit Switched (CS) and IP Multimedia Subsystem (IMS) services, which is incorporated herein by reference in its entirety, to establish a voice and video call. After the voice call is established, the video portion is initiated through a web session by the second user via the web browser 18B. To initiate the web session, the second user may connect to the service node 12 using an appropriate URL.

Through web session, the second user may then provide sufficient session information to identify the voice call with which a video portion is to be associated. The service node 12 may also obtain sufficient communication information via the web session or otherwise to allow the multimedia terminal 14 to deliver video content to the media player associated with the web browser 18B. The service node 12 may then interact with the multimedia terminal 14, and perhaps a media player associated with the web browser 18B, to set up the video session in parallel to the voice call such that video media can be provided from the multimedia terminal 14 to the media player of the web browser 18B. The multimedia terminal 14 may associate the voice call and the video session to provide a VAV call from the perspective of the multimedia terminal 14. Although the multimedia terminal 14 may associate the voice call and the video session to provide a VAV call, the voice call, and in particular the signaling and bearer path for the voice call, may remain unaffected in the CS 36 and the PSTN 26.

Figure 7A:
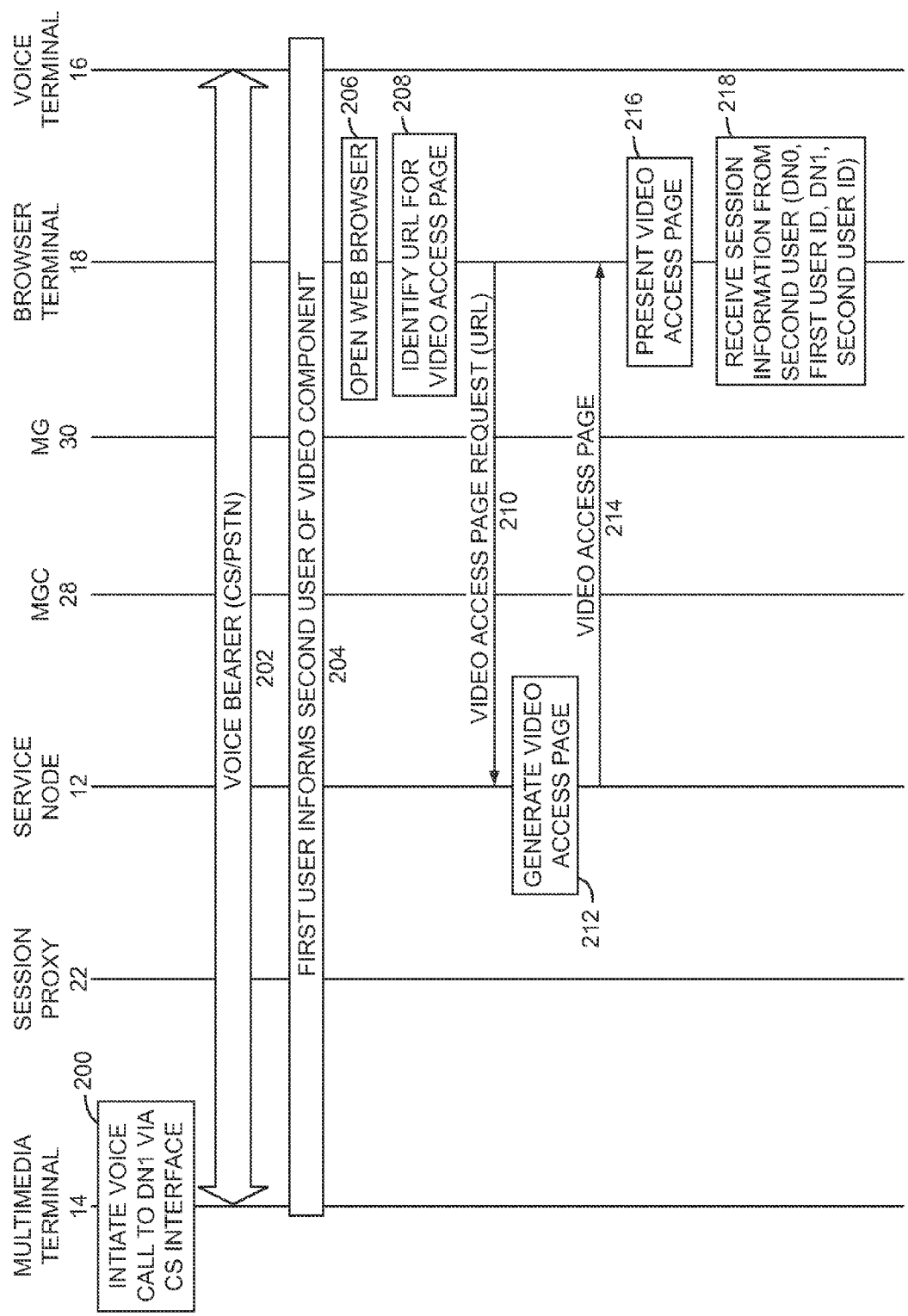
FIGS. 7A and 7B provide an exemplary communication flow according to another embodiment of the disclosure.
Figure 7B:
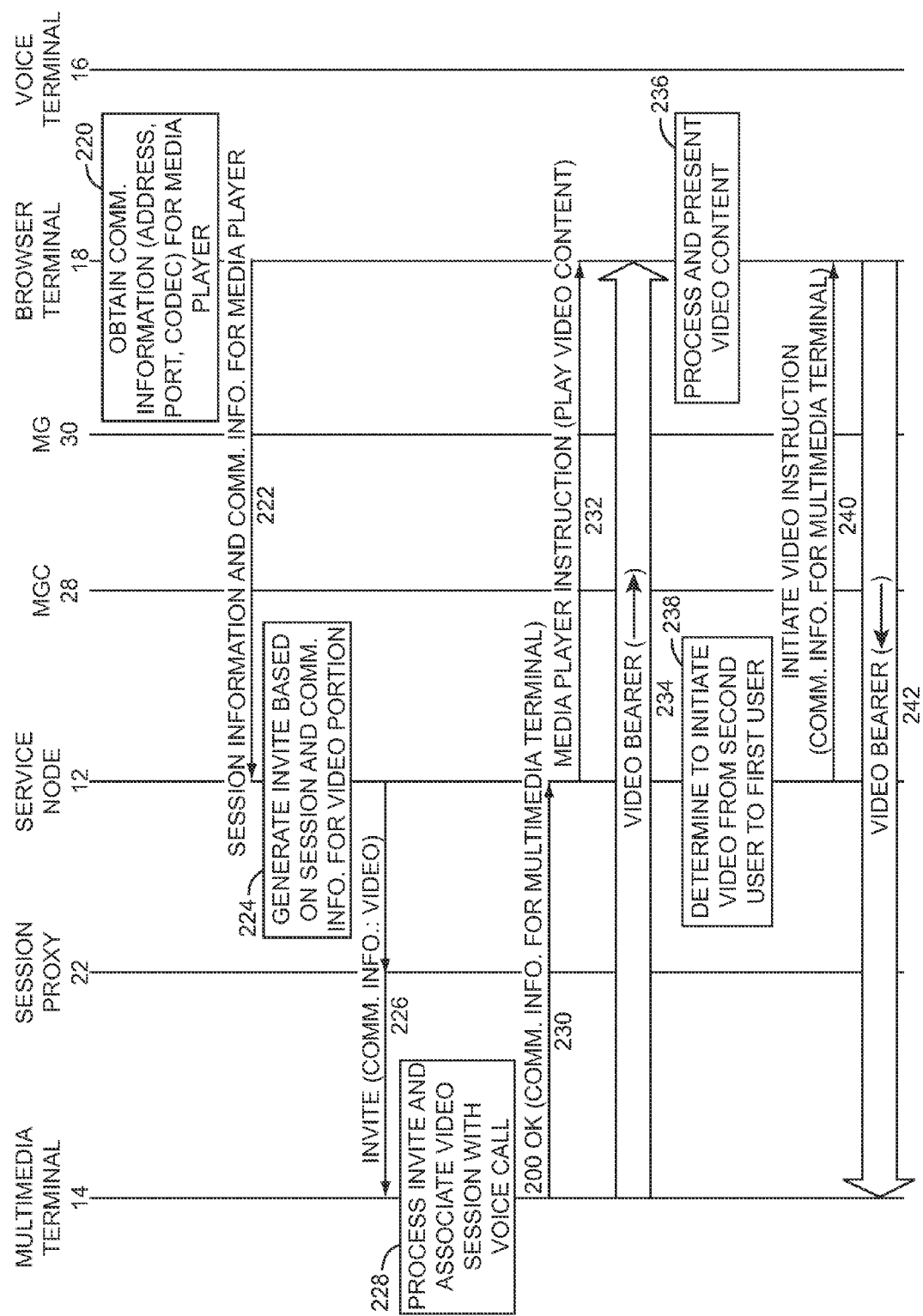

An exemplary communication flow for such a configuration is provided in FIGS. 7A and 7B. At some point, the first user decides to initiate a voice call, or session, from the multimedia terminal 14 using the directory number DN1. As illustrated, the first user will instruct the multimedia terminal 14 to initiate a voice cal to DN1, which is associated with the voice terminal 16. The multimedia terminal 14 will initiate the voice call toward directory number DN1 via the CS 36 (step 200). In response, a voice bearer is established for the voice call between the multimedia terminal 14 and the voice terminal 16 using available call setup mechanisms (step 202). Assume that the multimedia terminal 14 is supported by the CS 36 and the PS 24 and that the call is initiated and established via the CS 36 without involvement by the session proxy 22 or the service node 12.

In this example, assume that during the conversation that is supported between the first and second users over the voice bearer, the first user informs the second user that there is a video component available in association with the voice call (step 204). While talking with the first user via the voice terminal 16, the second user may interact with the browser terminal 18 and open the web browser 18B (step 206). The web browser 18B will identify a URL to use for accessing a video access page, which will help the user gain access to the video portion (step 208). The URL may be stored by the web browser 18B, or may be provided by the second user. In this example, assume the URL is stored in the web browser 18B, and the second user is able to select the URL from a list of stored URLs. Once selected, the web browser 18B will send a video access page request using the URL to the service node 12 (step 210).

Assume that the video access page request effectively initiates a web session with the web server function of the service node 12. In response to the video access page request, the service node 12 will generate an appropriate video access page (step 212) and send the video access page to the web browser 18B of the browser terminal 18 (step 214). The web browser 18B will present the video access page to the second user (step 216), and in this example, receive session information from the second user (step 218). Session information may, but need not, include identification of the first or second users (first user ID and second user ID), as well as the directory numbers associated with the voice call (DN0 and DN1). The web browser 18B of the browser terminal 18 may also obtain communication information, such as the address, port, and codec, for the media player associated with the web browser 18B (step 220), and send the session information and the communication information for the media player to the service node 12 via the web session through one or more messages (step 222). As indicated above, but not illustrated in this example, the service node 12 may require authentication of the second user prior to initiating access to the requested video portion.

When the service node 12 determines that access to the requested voice portion is appropriate and that communication information for the media player has been received, the service node 12 will generate a SIP invite with the communication information for the media player provided in the SDP for establishing a video session for the requested video portion (step 224). The invite may be directed toward the directory number DN0 and indicate that the voice call also involves DN1, the first user, the second user, or any combination thereof based on the session information. The SDP of the invite provides sufficient communication information, such as the address, port, and codec, to use for delivering the video content for the video portion of the VAV call to the media player of the web browser 18B. The invite for the video portion of the VAV call is sent to the multimedia terminal 14 via the session proxy 22 (step 226), wherein the multimedia terminal 14 will process the invite (step 228) and initiate the multimedia terminal 14 to provide video content for the requested video portion in association with the voice call. The invite may be so configured to cause the multimedia terminal 14 to associate the voice session that will be used to deliver the video content with the voice call to effectively transition the voice call to a VAV call with both voice and video portions.

In response to the invite, the multimedia terminal 14 may provide a 200 OK or other message with the communication information for the multimedia terminal 14 (step 230). This communication information may identify the address, port, and codec of the multimedia terminal 14 and is used by the browser terminal 18 for delivering video content back to the multimedia terminal 14 in association with the voice portion of the VAV call, if bi-directional video is desired. In response to the 200 OK message, the service node 12 may provide an instruction to the media player to prepare to play video content to be streamed from the multimedia terminal 14 (step 232).

Armed with the communication information for the media player of the web browser 18B, the multimedia terminal 14 may begin delivering video content for the video portion of the VAV call over the video bearer to the media player of the web browser 18B (step 234). The web browser 18B of the browser terminal 18 may process and present the video content to the second user (step 236). If and when bi-directional video is desired, the service node 12 may determine to initiate the delivery of video from the second user to the first user in response to an instruction from the second user via the web session, or the like (step 238). The service node 12 may send an instruction to initiate the delivery of video to the web browser 18B (step 240). The instruction may include the communication information for the multimedia terminal 14, and as such, the browser terminal 18 will be able to send select video content, whether recorded or live, to the multimedia terminal 14 using the communication information provided by the service node 12 (step 242).

Figure 8:
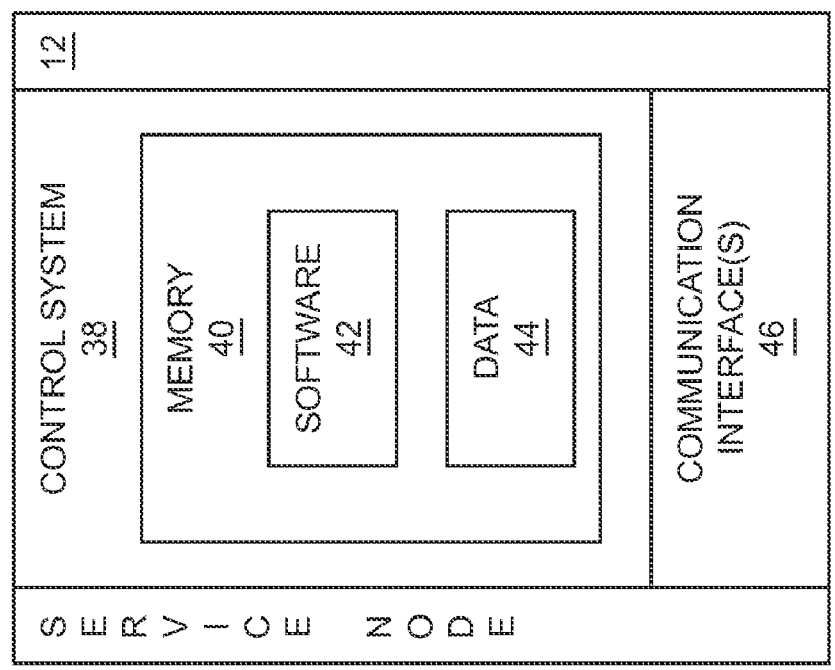
FIG. 8 is a block representation of a service node according to one embodiment of the disclosure.

With reference to FIG. 8, a block representation of a service node 12 is illustrated according to one embodiment. The service node 12 may include a control system 38 having sufficient memory 40 for the requisite software 42 and data 44 to operate as described above. The software 38 may provide the communication function, web server function, and interworking function, which are described above. The control system 38 may also be associated with one or more communication interfaces 46 to facilitate communications with the various entities illustrated in the communication environment 10, as well as any other entities being used during the implementation of the present invention.

Figure 9:
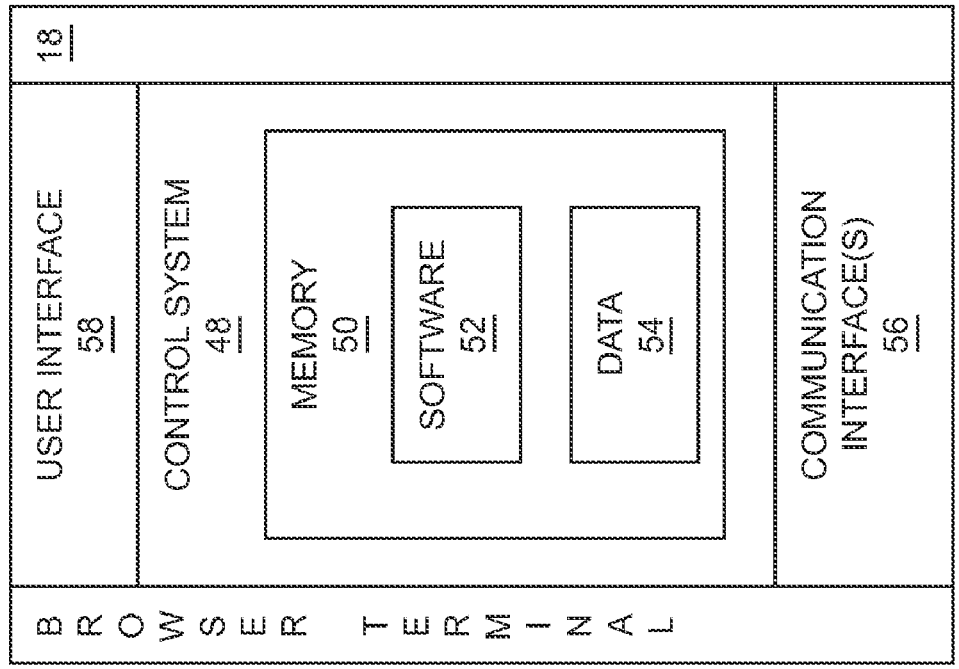
FIG. 9 is a block representation of a browser terminal (or voice terminal) according to one embodiment of the disclosure.

With reference to FIG. 9, a block representation of a browser terminal 18 (or a voice terminal 16) is illustrated. The browser terminal 18 may represent a telephone, personal computer, or the like, and may include a control system 48 having sufficient memory 50 for the requisite software 52 and data 54 to operate as described above. The control system 48 may be associated with one or more communication interfaces 56 to facilitate communications as described above, as well as a user interface 58. The user interface 58 may include input devices such as a keypad, mouse, touchscreen, microphone, and the like, as well as one or more output mechanisms, including speakers, displays, and the like.

Those skilled in the art will recognize improvements and modifications to the embodiments of the present invention. All such improvements and modifications are considered within the scope of the concepts disclosed herein and the claims that follow.

What is claimed is:

1. A method for providing access to a video portion of a voice and video call comprising:
    receiving a voice and video call that was originated from a multimedia terminal of a first user and intended to have a voice portion and a video portion;
    effecting establishment of a voice bearer between the multimedia terminal and a voice terminal of a second user to which the voice and video call is directed;
    establishing a web session with a web browser of the second user in which a desire of the second user to gain access to the video portion of the voice and video call is determined;
    identifying the voice and video call to which access is desired;
    obtaining first communication information sufficient to deliver first video content for the video portion of the voice and video call to a media player associated with the web browser; and
    delivering the first communication information toward the multimedia terminal, wherein the multimedia terminal or an agent thereof will deliver the first video content to the media player of the web browser using the first communication information.

2. The method of claim 1 wherein the first communication information comprises one or more of a group consisting of address information, port information, and codec information.

3. The method of claim 1 wherein the web session is initiated by the second user from the web browser, and establishing the web session comprises receiving a browser request from the web browser and responding to the browser request with a web page to initiate the web session.

4. The method of claim 3 wherein the voice and video call to which access is desired is identified based on identification information in a uniform resource locator that is provided in the browser request.

5. The method of claim 4 wherein the identification information comprises one of a group consisting of a directory number and a telephony address that is associated with the voice and video call.

6. The method of claim 5 wherein the identification information is associated with a voice terminal.

7. The method of claim 1 wherein at least a portion of the first communication information is obtained via the web session from the web browser or media player associated with the web browser.

8. The method of claim 1 wherein the web browser is provided on the voice terminal.

9. The method of claim 1 wherein the web browser is provided on a user terminal that is separate from the voice terminal.

10. The method of claim 1 wherein the voice terminal is not capable of supporting the video portion of the voice and video call.

11. The method of claim 1 wherein the voice terminal is not capable of supporting the voice and video call.

12. The method of claim 1 wherein the voice terminal is served by a public switched telephone network.

13. The method of claim 1 wherein the web browser has access to the Internet and the first video content is delivered via the Internet.

14. The method of claim 1 further comprising obtaining authentication information from the second user via the web session and determining whether the second user is authorized to gain access to the video portion of the voice and video call based on the authentication information.

15. The method of claim 14 further comprising generating the authentication information and effecting delivery of the authentication information to the first user.

16. The method of claim 1 further comprising:
    obtaining second communication information sufficient to deliver second video content of the second user to the multimedia terminal; and
    delivering the second communication information to the web browser via the web session, wherein the second video content of the second user can be provided to the multimedia terminal using the second communication information.

17. The method of claim 1 further comprising sending a request toward the multimedia terminal or the agent thereof to initiate delivery of the first video content to the media player associated with the web browser using the first communication information.

18. A communication service node for providing access to a video portion of a voice and video call comprising:
    at least one communication interface; and
    a control system associated with the at least one communication interface and adapted to:
        receive a voice and video call that was originated from a multimedia terminal of a first user and intended to have a voice portion and a video portion;
        effect establishment of a voice bearer between the multimedia terminal and a voice terminal of a second user to which the voice and video call is directed;
        establish a web session with a web browser of the second user in which a desire of the second user to gain access to the video portion of the voice and video call is determined;
        identify the voice and video call to which access is desired;
        obtain first communication information sufficient to deliver first video content for the video portion of the voice and video call to a media player associated with the web browser; and
        deliver the first communication information toward the multimedia terminal, wherein the multimedia terminal or an agent thereof will deliver the first video content to the media player of the web browser using the first communication information.

19. The communication service node of claim 18 wherein the web session is initiated by the second user from the web browser, and establishing the web session comprises receiving a browser request from the web browser and responding to the browser request with a web page to initiate the web session.

20. The communication service node of claim 19 wherein the voice and video call to which access is desired is identified based on identification information in a uniform resource locator that is provided in the browser request.

21. The communication service node of claim 20 wherein the identification information comprises one of a group consisting of a directory number and a telephony address that is associated with the voice and video call and the identification information is associated with voice terminal.

22. The communication service node of claim 18 wherein at least a portion of the first communication information is obtained via the web session from the web browser or the media player associated with the web browser.

23. The communication service node of claim 18 wherein the web browser is provided on the voice terminal.

24. The communication service node of claim 18 wherein the web browser is provided on a user terminal that is separate from the voice terminal.

25. The communication service node of claim 18 wherein the voice terminal is served by a public switched telephone network.

26. The communication service node of claim 18 wherein the control system is further adapted to obtain authentication information from the second user via the web session and to determine whether the second user is authorized to gain access to the video portion of the voice and video call based on the authentication information.

27. The communication service node of claim 26 wherein the control system is further adapted to generate the authentication information and to effect delivery of the authentication information to the first user.

28. A method for adding a video portion to an existing voice call that is established at least in part over a circuit-switched connection between a multimedia terminal of a first user and a voice terminal of a second user comprising:
 establishing a web session with a web browser of the second user in which a desire of the second user to add a video portion to the existing voice call is determined;
 obtaining session information associated with the multimedia terminal via the web session;
 obtaining at least a portion of first communication information sufficient to deliver first video content for the video portion to a media player associated with the web browser via the web session;
 identifying the multimedia terminal that is supporting the existing voice call based on the session information; and
 delivering toward the multimedia terminal instructions to augment the existing voice call with the video portion such that the multimedia terminal can deliver video content via the video portion to the media player of the web browser using the communication information.

29. The method of claim 28 wherein the web session is initiated by the second user from the web browser, and establishing the web session comprises receiving a browser request from the web browser and responding to the browser request with a web page.

30. The method of claim 28 wherein the existing voice call is established via a circuit-switched subsystem that supports the multimedia terminal and the video content is delivered via a packet subsystem that supports the multimedia terminal.

31. The method of claim 28 wherein the web browser is provided on the voice terminal.

32. The method of claim 28 wherein the web browser is provided on a user terminal that is separate from the voice terminal.

33. The method of claim 28 wherein the voice terminal is not capable of supporting a video session.

34. The method of claim 28 wherein the voice terminal is not capable of supporting a voice and video call.

35. The method of claim 28 wherein the voice terminal is served by a public switched telephone network.

36. The method of claim 28 wherein the web browser has access to the Internet and the first video content is delivered via the Internet.

37. The method of claim 28 wherein augmenting the voice call with the video portion results in the multimedia terminal providing a unified voice and video call.

\* \* \* \* \*